(12) United States Patent
Poole

(10) Patent No.: US 9,013,760 B1
(45) Date of Patent: Apr. 21, 2015

(54) METHOD AND APPARATUS FOR USING DATA COMPRESSION TECHNIQUES TO INCREASE A SPEED AT WHICH DOCUMENTS ARE SCANNED THROUGH A SCANNING DEVICE

(71) Applicant: Marvell International Ltd., Hamilton (BM)

(72) Inventor: David K. Poole, Boise, ID (US)

(73) Assignee: Marvell International Ltd., Hamilton (BM)

(*) Notice: Subject to any disclaimer, the term of this patent is extended or adjusted under 35 U.S.C. 154(b) by 111 days.

(21) Appl. No.: 13/765,545

(22) Filed: Feb. 12, 2013

Related U.S. Application Data

(60) Provisional application No. 61/599,176, filed on Feb. 15, 2012, provisional application No. 61/599,188, filed on Feb. 15, 2012.

(51) Int. Cl.
*H04N 1/387* (2006.01)
*H04N 1/191* (2006.01)

(52) U.S. Cl.
CPC ...................................... *H04N 1/1911* (2013.01)

(58) Field of Classification Search
None
See application file for complete search history.

(56) References Cited

U.S. PATENT DOCUMENTS

| | | | |
|---|---|---|---|
| 5,341,318 A | 8/1994 | Balkanski et al. | |
| 5,420,693 A | 5/1995 | Horiuchi et al. | |
| 5,504,591 A | 4/1996 | Dujari | |
| 5,864,362 A * | 1/1999 | Cutler | 348/96 |
| 5,907,637 A | 5/1999 | Murashita et al. | |
| 6,181,825 B1 | 1/2001 | Ragland et al. | |
| 6,600,836 B1 | 7/2003 | Thyagarajan et al. | |
| 6,798,914 B1 | 9/2004 | Nanni et al. | |
| 6,870,963 B2 | 3/2005 | Govindaswamy et al. | |
| 6,912,070 B1 | 6/2005 | Govindaswamy et al. | |
| 7,088,276 B1 | 8/2006 | Wegener | |
| 7,136,534 B2 | 11/2006 | Thyagarajan et al. | |
| 7,209,266 B2 | 4/2007 | Tabata et al. | |
| 7,656,561 B2 | 2/2010 | Molgaard et al. | |
| 7,724,827 B2 | 5/2010 | Liang et al. | |
| 8,249,339 B2 | 8/2012 | Tsuda et al. | |
| 8,320,697 B2 | 11/2012 | Watarai | |
| 2004/0052407 A1 * | 3/2004 | Kawabe | 382/124 |
| 2008/0036640 A1 * | 2/2008 | Tsai | 341/155 |
| 2009/0059031 A1 | 3/2009 | Miyakoshi | |

* cited by examiner

*Primary Examiner* — Vincent Rudolph
*Assistant Examiner* — Michael Burleson

(57) ABSTRACT

A scanner device includes a plurality of image sensor arrays and an image processing component. Each image sensor is configured to acquire a corresponding sequence of image slices, wherein the sequences of image slices are concurrently acquired, and wherein each sequence of image slices represents a contiguous partial scan of a target medium. The image processing component is configured to generate an image file representing the target medium based at least in part on the sequences of image slices.

17 Claims, 6 Drawing Sheets

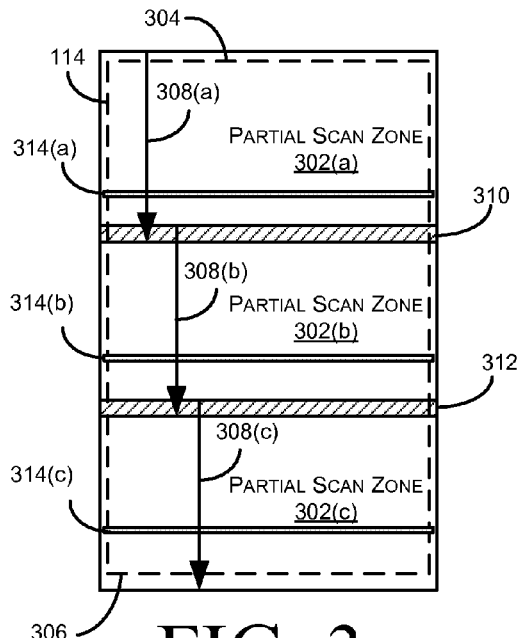
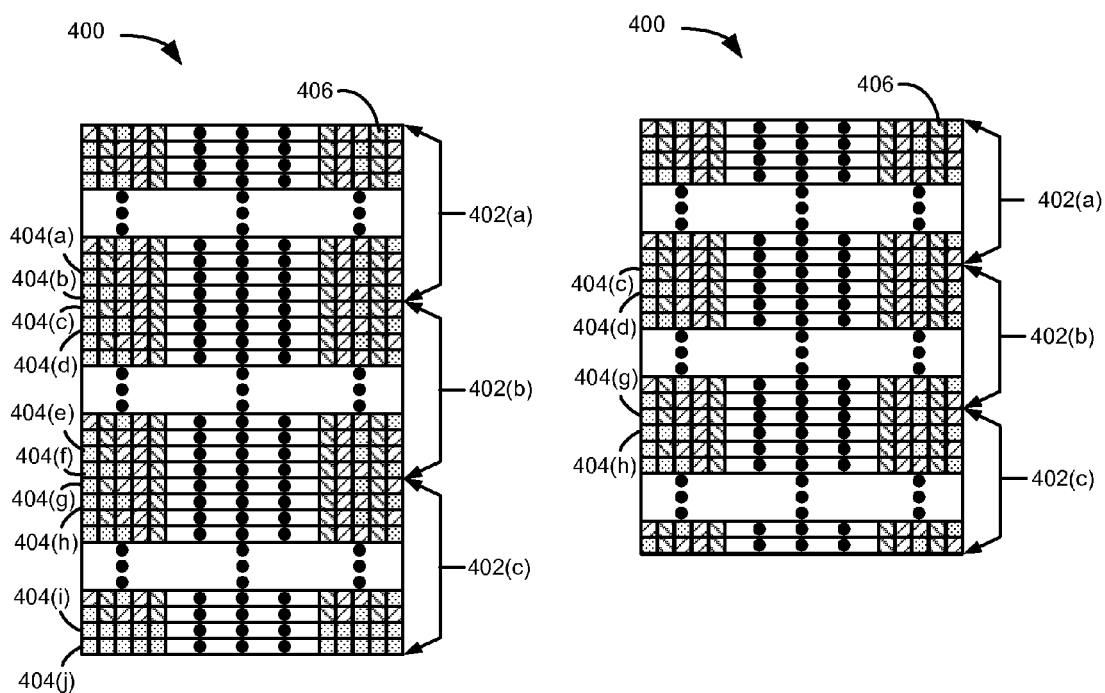
FIG. 3
FIG. 4A
FIG. 4B

METHOD AND APPARATUS FOR USING DATA COMPRESSION TECHNIQUES TO INCREASE A SPEED AT WHICH DOCUMENTS ARE SCANNED THROUGH A SCANNING DEVICE

CROSS REFERENCE TO RELATED APPLICATIONS

This claims priority to U.S. Provisional Patent Application No. 61/599,176, filed on Feb. 15, 2012 and to U.S. Provisional Patent Application No. 61/599,188, filed on Feb. 15, 2012, which are incorporated herein by reference.

This disclosure is related to U.S. patent application Ser. No. 13/765,515, filed concurrently with the subject disclosure, and which is incorporated by reference herein in its entirety.

TECHNICAL FIELD

Implementations of the present disclosure relate generally to the field of image scanners, and more particularly to techniques, structures, and configurations for faster duplex or simplex document and/or image scanning.

BACKGROUND

Conventional scanning devices acquire an image file of a sheet of paper (or document) by scanning, step by step, the sheet of paper. At each step, a conventional scanning device acquires, via an image sensor array, an image of a slice of the sheet of paper. The image sensor array captures analog values for the slice of the sheet of paper. These analog values are converted to digital values, which digital values are then used to form an image file of the sheet of paper.

Some conventional scanning devices have a paper transport path that stages a sheet of paper (i.e., moves the sheet of paper from an input position to a scan position) and ejects the sheet of paper (i.e., moves the sheet of paper from the scan position to an output position) after the sheet of paper has been scanned.

However, conventional scanning devices are slow. The amount of time necessary for staging a sheet of paper and ejecting a sheet of paper is much shorter than the time spent scanning the sheet of paper. Thus, if scanning speed were faster, the overall time to stage, scan, and eject a piece of paper could be substantially reduced.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In an embodiment, the present disclosure provides a scanner device comprising a plurality of image sensor arrays and an image processing component. Each image sensor array is configured to acquire a corresponding sequence of image slices such that there is a plurality of corresponding sequences of image slices. Each one of the plurality of corresponding sequences of image slices is concurrently acquired, and each one of the plurality of corresponding sequences of image slices represents a contiguous partial scan of a target medium by a corresponding image sensor array of the plurality of image sensor arrays. The image processing component is configured to generate an image file representing the target medium scanned by the plurality of image sensor arrays based at least in part on the plurality of corresponding sequences of image slices.

In a further embodiment, the present disclosure provides a scanner device comprising a carriage, a carriage motor, an analog front end component, and an image processing component. The carriage motor is configured to translate the carriage during a scan of a target medium carriage, and the carriage carries a plurality of image sensor arrays. Each image sensor array is configured to acquire a corresponding sequence of analog image slices. The sequences of analog image slices are concurrently acquired, and each sequence of analog image slices represents a contiguous partial scan of the target medium by a corresponding image sensor array. The analog front end component is configured to receive the plurality of sequences of analog image slices and convert the plurality of sequences of analog images slices into a corresponding plurality of sequences of digital image slices. The image processing component is configured to generate an image file representing the target medium scanned by the plurality of image sensor arrays based at least in part on the plurality of sequences of digital image slices.

In a further embodiment, the present disclosure provides, a method of scanning a target medium comprising: concurrently acquiring a plurality of sequences of image slices with a corresponding plurality of image sensor arrays; and generating an image file representing the target medium scanned by the plurality of image sensor arrays based at least in part on the plurality of sequences of image slices. Each sequence of image slices of the plurality of image slices represents a contiguous partial scan of a target medium by a corresponding image sensor array of the plurality of image sensor arrays.

The details of one or more implementations are set forth in the accompanying drawings and the description below. Other features and advantages will be apparent from the description and drawings, and from the claims.

BRIEF DESCRIPTION OF THE DRAWINGS

FIG. 3 is a schematic diagram of scan zones by the carriage of FIG. 1.

FIGS. 4A and 4B are schematic diagrams of an image file at different stages of processing.

Like reference symbols in the various drawings indicate like elements.

DETAILED DESCRIPTION

The present disclosure describes techniques, components, modules, and configurations for implementing fast scanners.

Figure 1:
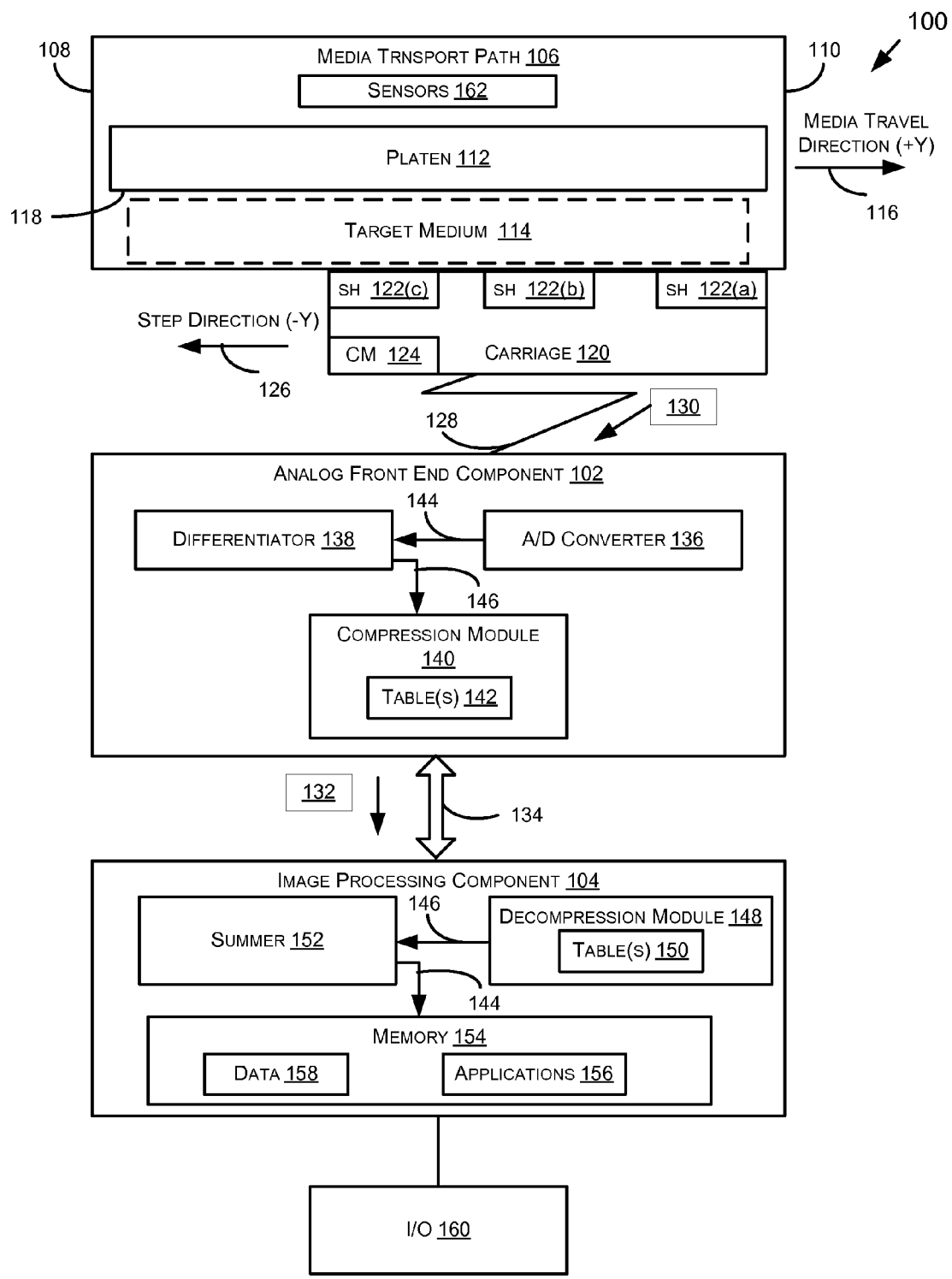
FIG. 1 is a schematic diagram of a scanner having an analog front-end component and an image processing component in accordance with one implementation.

FIG. 1 is a schematic diagram of an example scanner device 100 having an analog front-end component 102 and an image processing component 104. One or more aspects of the scanner device 100 illustrated in FIG. 1, including one or more portions of the analog front-end component 102 and/or the image processing component 104 may be implemented in hardware or a combination of hardware and software. The scanner device 100, including one or more portions of the analog front-end component 102 and/or the image processing component 104, may be implemented as part of a system on a chip, as a series of discrete hardware components, as one or more application specific integrated circuits (ASICs), as one or more field programmable gate arrays (FPGAs), or other hardware-based solution. One or more components of the scanner device 100, including one or more portions of the analog front-end component 102 and/or the image processing component 104, may be software-based, such as may be stored in firmware in read-only memory (ROM) or flash memory, and configured to be executable by one or more processors.

The scanner device 100 includes a media transport path 106 having an ingress side 108, an egress side 110, and a platen 112 disposed between the ingress side 108 and the egress side 110. The media transport path 106 may also include rollers, motors, step motors, and guides that advance a target medium 114, from the ingress side 108, to a scan position beneath the platen 112, and further advance the target medium 114 from beneath the platen 112 to, or beyond, the egress side 110. The target medium 114 may be any medium such as paper, plastic, cardboard, etc. for scanning by the scanner device 100. Arrow 116 indicates the travel direction (+Y direction) of the target medium 114 as the target medium 114 advances along the media transport path 106.

The platen 112 includes a surface 118 against which the target medium 114 may be positioned. In some implementations, the surface 118 may be generally planar. In other implementations, the surface 118 may be curved. For example, the platen may be approximately or completely cylindrical similar to a roller or drum.

The scanner device 100 may also include a carriage 120 having a plurality of scan heads, collectively referenced as 122 and individually referenced as 122(a)-122(c), disposed facing the surface 118 of the platen 112. The carriage 120 may be a rigid assembly that carries the scan heads 122.

In some implementations, the platen 112 may interpose the target medium 114 and the scan heads 122. In such implementations, the platen 112 may be glass or plastic or other transparent or translucent material, and the surface 118 may be generally planar. Such platen 112 may be arranged such that the surface 118 is proximal to the target medium 114.

A scan head 122 may include one or more image sensor arrays, optical elements such as lenses, prisms, mirrors, etc., and one or more light sources for illuminating the target medium 114. The optical elements may focus an image sensor array onto the target medium 114 and guide light to the target medium 114. An image sensor array is comprised of a plurality of image sensors aligned in a row to form an optical scan direction. Non-limiting examples of image sensors include charge-coupled device (CCD) and contact image sensor (CIS). Contact image sensors may be positioned extremely near the target medium 114 being scanned (as "in contact") and may include light sources such as light emitting diodes (LEDs) for illuminating the target medium 114. Further, an image sensor array having contact image sensors may omit optical elements for focusing the contact image sensors onto the target medium 114.

Although three scan heads 122 are shown, the carriage 120 may include more, or fewer, scan heads 122 in some embodiments. The carriage 120 may include one or more step motors or carriage motors (CM) 124 for stepping the carriage 120 in a step direction, indicated by arrow 126. The carriage motor (s) 124 may step the carriage 120 by a step size ($d_{STEP}$) from one scan location to the next, which may be separated from each other by a scan step size ($d_{SCAN}$), where the scan step size ($d_{SCAN}$) may be an integer multiple of the step size ($d_{SCAN}=M \times d_{STEP}$, where M=1, 2, 3, . . . ). At each scan step, each one of the scan heads 122 concurrently captures an image of a slice (or image slice) of the target medium 114 during an interval of time, which is referred to herein as a scan interval of time, and after the scan interval of time, the carriage 120 may be moved/stepped by the carriage motor to a subsequent scan step. Collectively, image slices from each of the scan heads 122 are gathered and processed to form an image of the target medium 114.

The analog front-end component 102 is communicatively coupled to the scan heads 122, via a communications link 128 such as, but not limited to, one or more wires, ribbon cable(s), or other signal carrier. The communication link 128 carries analog signals 130 from the scan heads 122 to the analog front-end component 102. The analog signals 130 are analog pixel values from image sensor arrays of the scan heads 122. The analog front-end component 102 processes the analog signals 130 to output digital signals 132, which are provided, via the communication link 134 such as a bus, to the image processing component 104. In some implementations, the digital signals 132 are compressed, which increases the throughput of data between the analog front-end component 102 and the image processing component 104, and accordingly, increases the speed of the scanner device 100.

The analog front-end component 102 includes an analog-to-digital (A/D) converter 136 and may include either one or both of a differentiator 138 and a compression module 140 for processing the analog signals 130 for outputting the digital signals 132. The A/D converter 136 converts analog input (e.g., analog pixel values) into digital output (e.g., digitized pixel values). The differentiator 138 differentiates input (e.g., analog pixel values or digitized pixel values), and the compression module 140 compresses data. Data compressed by the compression module may include digitized/differentiated analog pixel values (i.e., analog pixel values are first differentiated and then the differentiated values are digitized) and/or differentiated/digitized pixel values (i.e., analog pixel values are first digitized and then the digitized pixel values are differentiated). The compression module 140 may employ lossy or lossless compression algorithms, which may employ tables 142, to compress data. As one non-limiting example, a compression algorithm employed by the compression module 140 may be Huffman coding, and tables 142 may include prefix tables or Huffman code tables.

It should be noted that the differentiator 138 may also compress input data. Frequently, when a scan head 122 acquires an image of a slice of a target medium 114, adjacent image sensors in the scan head 122 record pixel values that are similar because changes in the target medium 114 may be long in comparison to spacing of the image sensors. For example, spatial resolution of a scan head 122 may be approximately in the range of 300-25,000 pixels per inch (ppi) or dots per inch (dpi). Consider a text document, which may be a monochromatic (e.g., white) sheet of paper with black text, that is scanned with a scan head 122 having a resolution of 1000 ppi. In such a situation, the scanned text document is primarily white and sparsely black, and most image sensors in the scan head 122 will record pixel values that are similar to their neighbors. For example, the letter "t" written in regular, 12 point, Times New Roman font has a width that is approximately 0.04 inch and could, depending in part on alignment, be sampled by approximately 40 sensors. If the scan were across the horizontal cross bar having a width of approximately 0.04 inch, then each of the 40 sensors would sample the color black. If the scan were across the approximate center of the stem of the letter "t," which has a width of approximately 0.01 inch, then (from left to right) approximately ten of the forty sensors would sample the color white, ten would sample the color black, and twenty would sample the color white.

The differentiator 138 determines pixel value deltas (i.e., differences between the pixel values for adjacent image sensors in the scan head 122). The pixel value deltas represent the image of the slice of the target medium 114 in fewer bits than the pixel values.

In one aspect, differentiation corresponds to determining a delta (if any) between adjacent pixel values along a given slice. For example, the differentiator 138 may differentiate an array of pixel values, $PV=\{pv_1, pv_2, pv_3, \ldots, pv_N\}$, by determining delta between $pv_1$ and $pv_2$, $pv_2$ and $pv_3$, and so on to $pv_{(N-1)}$ and $pv_N$.

In some implementations, the tables 142 are pre-generated in accordance with the compression algorithm. For example, sample documents are analyzed to create a set of prefixes for encoding the sample documents. The set of prefixes are included in tables 142 for encoding other documents.

The tables 142 may also include one or more scanner-mode tables for use with various modes of operation of the scanner device 100. Modes of operation of the scanner device 100 may include, but are not limited to: (1) Text Document mode, which may be employed for scanning a document having characters of a written language; (2) Mixed Document mode, which may be employed for scanning a document having characters of a written language and images; (3) Image mode, which may be employed for scanning a document having images); and (4) High/Medium/Low Resolution modes, which may employed for scanning a document and producing an image with the corresponding resolution.

In some embodiments, the analog front-end component 102 processes analog signals 130 from individual scan heads 122(a)-122(c) in parallel. In some embodiments, the analog front-end component 102 includes multiple A/D converters 136, differentiators 138 and compression modules 140 for processing analog signals 130 from individual scan heads 122(a)-122(c) in parallel.

The image processing component 104 includes a decompression module 148, which employs lossy or lossless decompression algorithms to decompress compressed input (e.g., digital signals 132). In some implementations, the decompression module 148 employs tables 150, which may correspond to tables 142, to decompress the compressed input.

In some implementations, the image processing component 104 also includes a summer 152. The summer 152 operates on inputs (e.g., differentiated/digitized pixel values) to undo operations of the differentiator 138 for generating an output (e.g., digitized pixel values).

In the illustrated implementation, the A/D converter 136 digitizes the analog pixel values carried by analog signals 130 into digitized pixel values 144, which are provided to the differentiator 138. The differentiator 138 differentiates the digitized pixel values 144 into differentiated/digitized pixel values 146, which are provided to the compression module 140. The compression module 140 compresses the differentiated/digitized pixel values 146 into digital signals 132, which are provided to the decompression module 148 of the image processing component 104. The decompression module 148 decompresses the digital signals 132 to recover differentiated/digitized pixel values 146 from the digital signals 132. The summer 152 processes the differentiated/digitized pixel values 146 to recover digitized pixel values 144.

In other implementations, the order of operations of the A/D converter 136, the differentiator 138 and/or the compressor module 140 may be interchanged. However, the operations of the A/D converter 136, differentiator 138 and the compressor module 140 are generally not commutative, so the order of operations of the decompression module 148 and the summer 152 may be correspondingly interchanged to be in reverse order of the differentiator 138 and compressor module 140. For example, the differentiator 138 may differentiate the analog pixel values carried in the analog signal 130 to create differentiated analog pixel values, which are provided to the A/D converter 136. The A/D converter 136 may digitize the differentiated analog pixel values into digitized/differentiated pixel values, which are then provided to the compression module 140. The compression module 140 may compress the digitized/differentiated pixel values, which may then be provided as digital signals 132. Correspondingly, the decompression module 148 may decompress the digital signals 132 to recover digitized/differentiated pixel values, which are then provided to the summer 152. The summer 152 may then recover digital pixel values from the digitized/differentiated pixel values.

The differentiator 138 may be, in some embodiments, omitted or, in some instances, bypassed such that the compression module 140 receives, from the A/D converter 136, digitized pixel values, which may be compressed and provided as digital signals 132. In such embodiments and/or instances, the decompression module 148 may be similarly omitted or bypassed.

Similarly, the compression module 140 and decompression module 148 may be, in some embodiments, omitted or, in some instances, bypassed. However, as discussed above, the differentiator 138 also compresses input data (e.g., digitized pixel values or analog pixel values), and consequently, in embodiments and/or instances in which the compression module 140 and decompression modules are omitted and/or bypassed, the size of the digital signals 132 may be smaller than the digitized pixel values 144 due to compression by the differentiator 138.

The image processing component 104 includes a memory 154 in which applications 156 and data 158 may be stored. Among other things, applications 156 may include instructions for methods and processes discussed herein such as, but not limited to, gathering and organizing digitized pixel values 144 into an image file that corresponds to the target medium 114. Data 158 may include, among other things, data for applications 156 and image files, in part or in whole.

The scanner device 100 may also include input/output (I/O) devices 160. Input/output devices 160 may include key(s), keypad(s), keyboard(s), display device(s), touchpad(s), touchscreen(s), etc. for providing a user interface. A user of the scanner device 100 may provide inputs to the I/O devices 160 for selecting user options such as target document size, scan orientation (e.g., portrait, landscape), scan quality (high, medium, low resolution), etc. The scanner device 100 may also include one or more sensors 162 arranged in the media transport path 106. The sensors 162 may detect, among other things, the target document size and/or orientation of the target medium 114. The user input and/or data from the sensors 162 may be provided to the image processing component 104 for controlling operations of the scanner device 100 such as stepping of the carriage 120 and/or relative positioning of the scan heads 122.

In some embodiments, the scanner device 100 may scan the target medium 114 by repeatedly translating the target medium 114 relative to the scan heads 122 by a scan step size and acquiring an image slice of the target medium 114 at each scan step. The relative translation between the target medium 114 and the scan heads 122 may occur by one or more steps of the target medium 114, one or more steps of the one or more scan heads 122, or by a combination of at least one step of the target medium 114 with at least one step of the one or more scan heads 122.

Figure 2A:
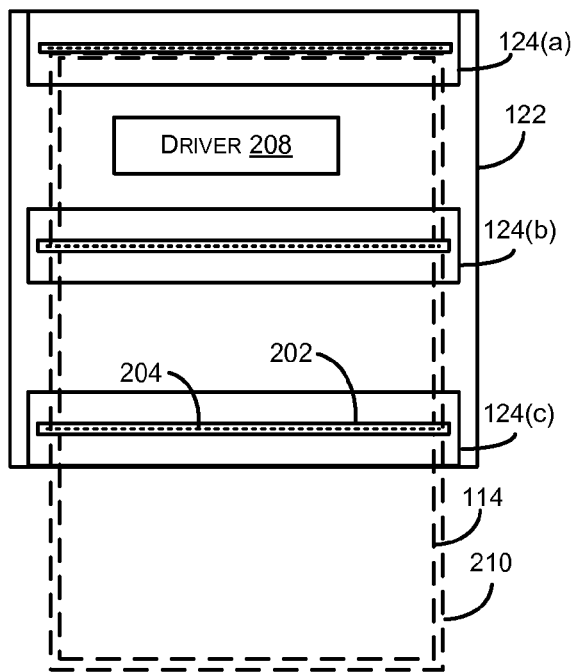
FIGS. 2A and 2B are schematic diagrams of the carriage of the scanner of FIG. 1 at different stages of a scan.
Figure 2B:
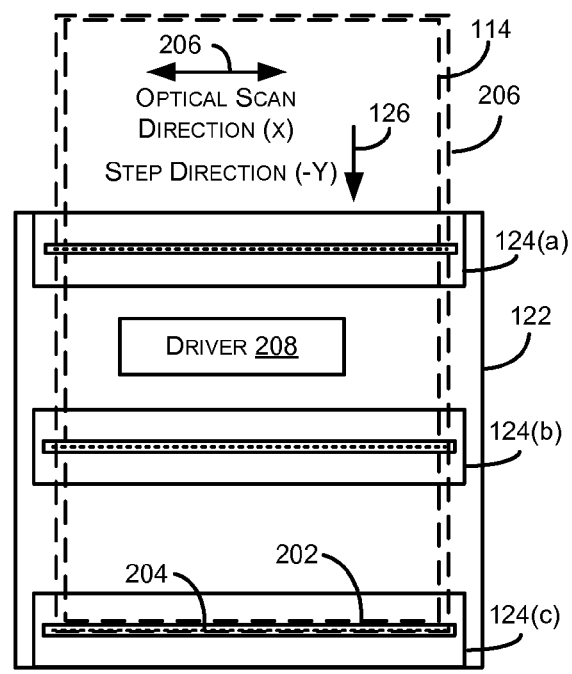

FIGS. 2A and 2B schematically illustrates a top view of the carriage 120 of the scanner device 100 of FIG. 1 at a beginning stage and an ending stage, respectively, of scanning the target medium 114 of FIG. 1. Each scan head 122 of the carriage 120 includes an image sensor array 202 having a plurality of image sensors 204. The image sensor arrays 202 of the scan heads 122(a)-122(c) are arranged generally parallel to an optical scan axis (X) 206.

The carriage 120 may include one or more drivers 208. The drivers 208 drives one or more of the scan heads 122 such that the image sensor arrays 202 of the scan heads 122 are separated, in the step direction 126, by a desired separation distance (dx). In some implementations, the image processing component 104 determines the desired separation distances (dx) and controls the head drivers 208.

In some implementations, the desired separation distances (dx) between the image sensor arrays 202 of the scan heads 122 is based in part on a total scan length (S_length) divided by the number of the image sensor arrays 202 in the carriage 120 so as to reduce or minimize the total travel distance (D) of the carriage. For example, an 8.5 inch by 11 inch sized target document, arranged in portrait orientation, has a total scan length (S_length) of 11 inches, and the carriage 120 has three image sensor arrays 202, and in such case, the separation distances (dx) between the image sensor arrays 202 is 11/3 inches or approximately 3.667 inches.

Referring to FIG. 2A, prior to commencing a scan, the carriage 120 is located at an initial scan position and the target medium 114 is positioned in a scan zone 210. During the scan of the target medium 114, the carriage 120 is stepped, in step direction 126, from the initial scan position to a final scan position, as shown in FIG. 2B. At each scan step, each image sensor array 204 captures an image slice of the target medium 114. Collectively, the image slices comprise an image of the target medium 114. Each image slice is comprised of pixel values corresponding to values recorded by the image sensors 204. The target medium 114 is positioned in the scan zone 210 such that the image sensor array 202 of the scan head 122(a) is offset from the target medium 114 at the beginning of the scan. Further, the carriage 120 is stepped a total travel distance (D) such that the image sensor array 202 of the scan head 122(c) is offset from the target medium 114 at the end of the scan. In this way, the scan head 122(a) acquires one or more image slices before a leading edge of the target medium 114, and the scan head 122(c) acquires one or more scan slices after a trailing edge of the target medium 114.

FIG. 3 schematically illustrates partial scan zones, collectively referenced as 302 and individually referenced as 302(a)-302(c), by the carriage 120 relative to the target medium 114. Partial scan zone 302(a) corresponds to the area of the target medium 114 that the scan head 122(a) is stepped over while scanning the target medium 114 and similarly for partial scan zones 302(b) and 302(c). In some implementations, partial scan zone 302(a) may start before a leading edge 304 of the target document 114, and partial scan zone 302(c) may end after a trailing edge 306 of the target document 114. Arrows 308(a)-308(c) represent the travel distance (D) of each image sensor array 202 of the corresponding scan heads 122(a)-122(c). The travel distance (D) may be such that there are overlaps of the scanning zones 302. For example, area 310 represents an overlap of scanning zones 302(a) and 302(b), and area 312 represents an overlap of scanning zones 302(b) and 302(c).

Each one of the partial scan zones 302 is comprised of multiple scan slices, collectively referenced as 314 and individually referenced as 314(a)-314(c). Scan slice 314(a) corresponds to a slice of the target medium 114 that the image sensor array 202 of the scan head 122(a) scans at a scan step to capture an image slice of the target medium and similarly for scan slices 314(b) and 314(c).

In the case where the scan head 122(a) is initially aligned with the leading edge 304 of the target medium 114 and there are no overlap areas 310, 312, the entire length, or scan length (S_length), of the target medium 114 is scanned by a total relative translation between the scan heads 122 and the target medium 114 of the travel distance (D), which in this case is one-third of the scan length (S_length) of the target medium 114. The amount of time to scan the target medium 114 with three scan heads 122(a)-122(c) may be approximately one-third the time for scanning the target medium 114 with only one scan head because, with three scan heads 122(a)-122(c), three image slices may be captured at each scan step, and because the number of steps for the total travel distance (D) is approximately one-third of the number of steps for the scan length (S_length) of the target medium 114.

In the case where a scan of the target medium 114 yields overlap areas 310, 312, and an excess amount after the trailing edge 306 of the target medium 114, the time for such a scan is generally not substantially longer than the case where there is no overlap areas 310, 312 and no excess amount after the trailing edge 306 of the target medium 114 because the overlap areas 310, 312 and the excess amount after the trailing edge 306 of the target medium 114 represent a small number of scan steps in comparison to the number of scan steps in a partial scan zone 302. For example, assume the overlap areas 310, 312 and the excess amount after the trailing edge 306 of the target medium 114 correspond to five scan steps, that the scanner 100 has a scan step size of 1/1000 inch, and that the target medium 114 is an 8.5×11 sheet arranged in portrait orientation. Then to fully scan the target medium 114, with scan heads 122(a)-122(c), would require 3667 scan steps ((11 inches×1000 scan steps per inch)/3) plus the five additional scan steps for the overlap areas 310, 312 and the excess amount after the trailing edge 306 of the target medium 114. The additional steps for scanning the overlap areas 310, 312 and the excess amount after the trailing edge 306 of the target medium 114 is less than a one percent increase.

FIGS. 4A and 4B show an image file 400 of the target medium 114 stored in memory 154 at different stages of processing by the image processing component 104. The image file 400 is comprised of a number of partial image files, collectively referenced as 402 and individually referenced as 402(a)-402(c). The partial image files 402(a)-402(c) correspond to partial scan zones 302(a)-302(c), respectively, of the target document 114. Each partial image file 402 includes a number of digital image slices, collectively referenced as 404 and individually referenced as 404(a)-404(d), captured by a corresponding one of the image sensor arrays 202 during a scan step of the target medium 114. Each digital image slice 404 is comprised of digitized pixel values 406, which correspond to analog pixel values recorded by image sensors 204 of the corresponding image sensor arrays 202.

The pair of digital image slices 404(a) and 404(b) and the pair of digital image slices 404(e) and 404(f) are the last two digital image slices of the partial image file 402(a) and 402(b), respectively. The pair of digital image slices 404(c) and 404(d) and the pair of digital image slices 404(g) and 404(g) are the first two digital image slices of the partial image file 402(b) and 402(c), respectively. Because each of the scan heads 122(a) and 122(b) scanned the overlap area 310 of the target medium 114, the digital image slices 404(a) and 404(b) are the same as the digital image slices 404(c) and 404(d). Similarly, the digital image slices 404(e) and 404(f) are the same as the digital image slices 404(g) and 404(h), respectively, because the scan heads 122(b) and 122(c) scanned the overlap area 312 of the target medium 114.

However, in some instances, image slices 404 of an overlap area 310 may be approximately or virtually the same, but not identically the same. For example, there may be differences between scan heads 122(a) and 122(b) that may result in differences in the pair of digital image slices 404(a) and 404(b) and the pair of digital image slices 404(e) and 404(f).

Image slices 404(i) and 404(j) are the last two digital image slices of the partial image file 404(c) and correspond to scans by the scan head 122(c) after the trailing edge 306 of the target medium 114.

The image processing component 104 may determine which, if any, digital image slices 404 correspond to scans of an overlap area 310, 312, and may remove duplicate digital image slices 404. The image processing component 104 may determine duplicate digital image slices 404 based at least in part on comparing digitized pixel values 406 of the corresponding digital image slices 404.

The image processing component 104 may also determine which, if any, digital image slices 404 correspond to scans before the leading edge 304 and/or after the trailing edge 306 of the target medium 114, and may remove such digital image slices from the image file 400. The image processing component 104 may determine that a scan slice 404 corresponds to scans before the leading edge 304 and/or after the trailing edge 306 of the target medium 114 based at least in part on digitized pixel values 406 of digital image slices 404. For example, a digital image slice 404 having constant digitized pixel values 406 might correspond to a scan before the leading edge 304 and/or after the trailing edge 306 of the target medium 114.

As shown in FIG. 4B, the image processing component 104 has removed duplicate digital image slices 404(a), 404(b), 404(e) and 404(f) and has removed images slices 404(i) and 404(j) to generate the image file 400.

Figure 6:
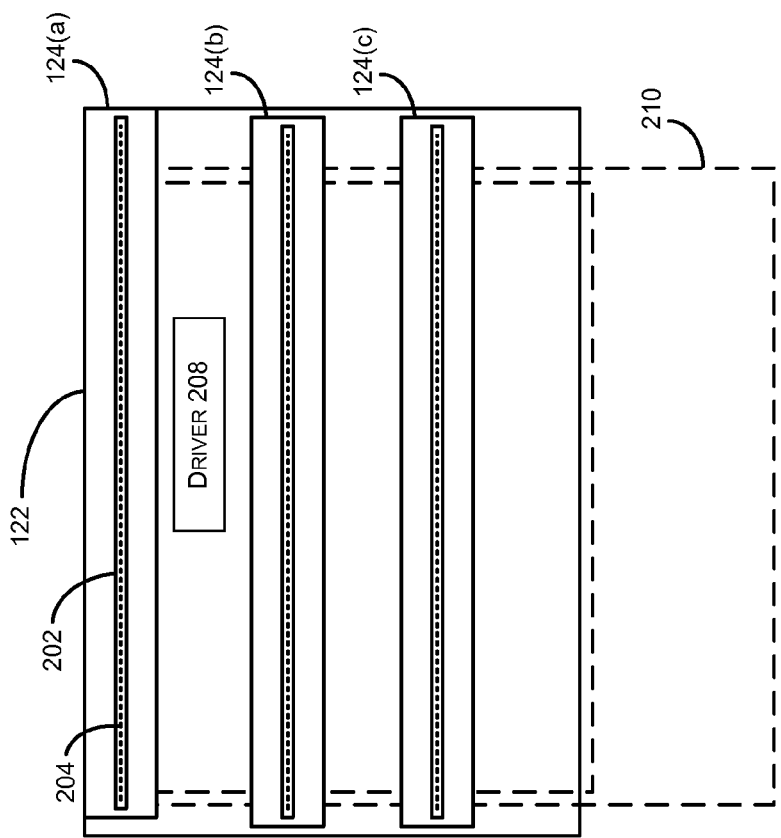
FIGS. 5 and 6 are schematic diagrams of a target medium arranged, in two different orientations.
Figure 5:
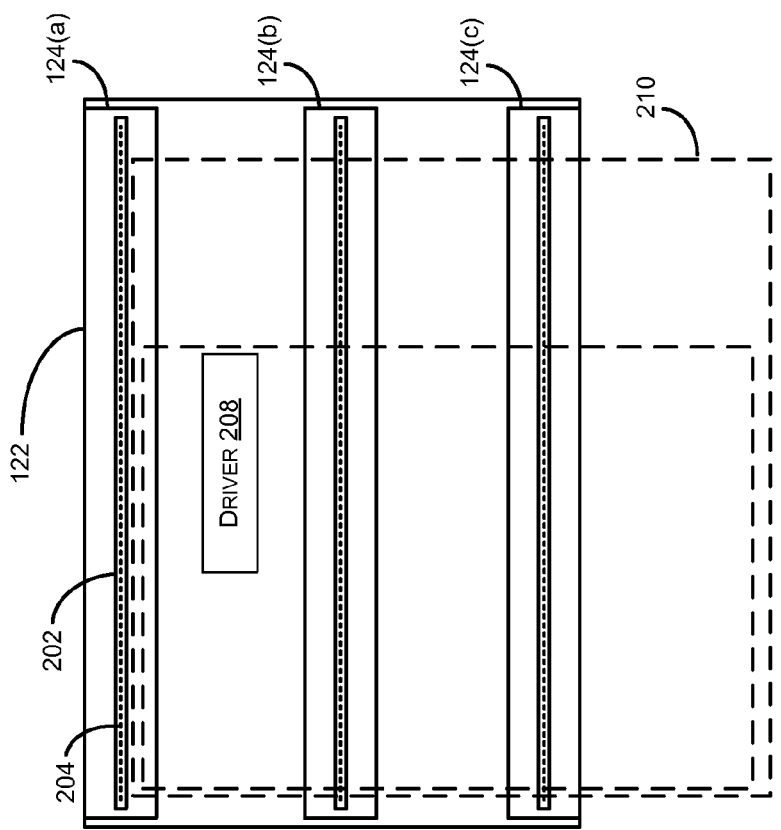

FIGS. 5 and 6 schematically illustrate the target medium 114 arranged in two different orientations (e.g., portrait and landscape orientations) for scanning by the scan heads 122 of the carriage 120. A user may place the target medium 114 in the scanning zone 210 with the target medium 114 aligned in the first orientation (e.g., landscape orientation), as shown in FIG. 5, or aligned in the second orientation (e.g., portrait orientation), as shown in FIG. 6. Alternatively, the user may place the target medium 114 in the media transport path 106 with the target medium 114 aligned in the first orientation or the second orientation, as shown in FIGS. 5 and 6, respectively, and the media transport path 106 may advance the target medium 114 to the scanning zone 210.

A user may provide user input, via the I/O devices 160, to select a scan orientation of the target medium 114 and may select a scan size for the target medium 114. The image processing component 104 may determine separation distances (dx) for the scan heads 122 based at least in part on the user input.

However, in some embodiments, the scanner device 100 may include sensors that may detect a size and/or an orientation of the target medium 114. In such embodiments, the image processing component 104 may determine separation distances (dx) for the scan heads 122 based at least in part on data from such sensors.

In an example, the target medium 114 is an 8.5×11 inch sheet. The image processing component 104 determines a separation distance of 11/3 inches, when the target medium 114 is arranged in the first orientation, as shown in FIG. 5, and determines a separation distance of 8.5/3 inches, when the target medium 114 is arranged in the second orientation, as shown in FIG. 6.

The image processing component 104 provides control signals to the driver 208 for relative positioning of the scan heads 122. The driver 208 then drives one or more of the scan heads 122 such that the scan heads 122 are separated by the determined separation distance.

Figure 7:
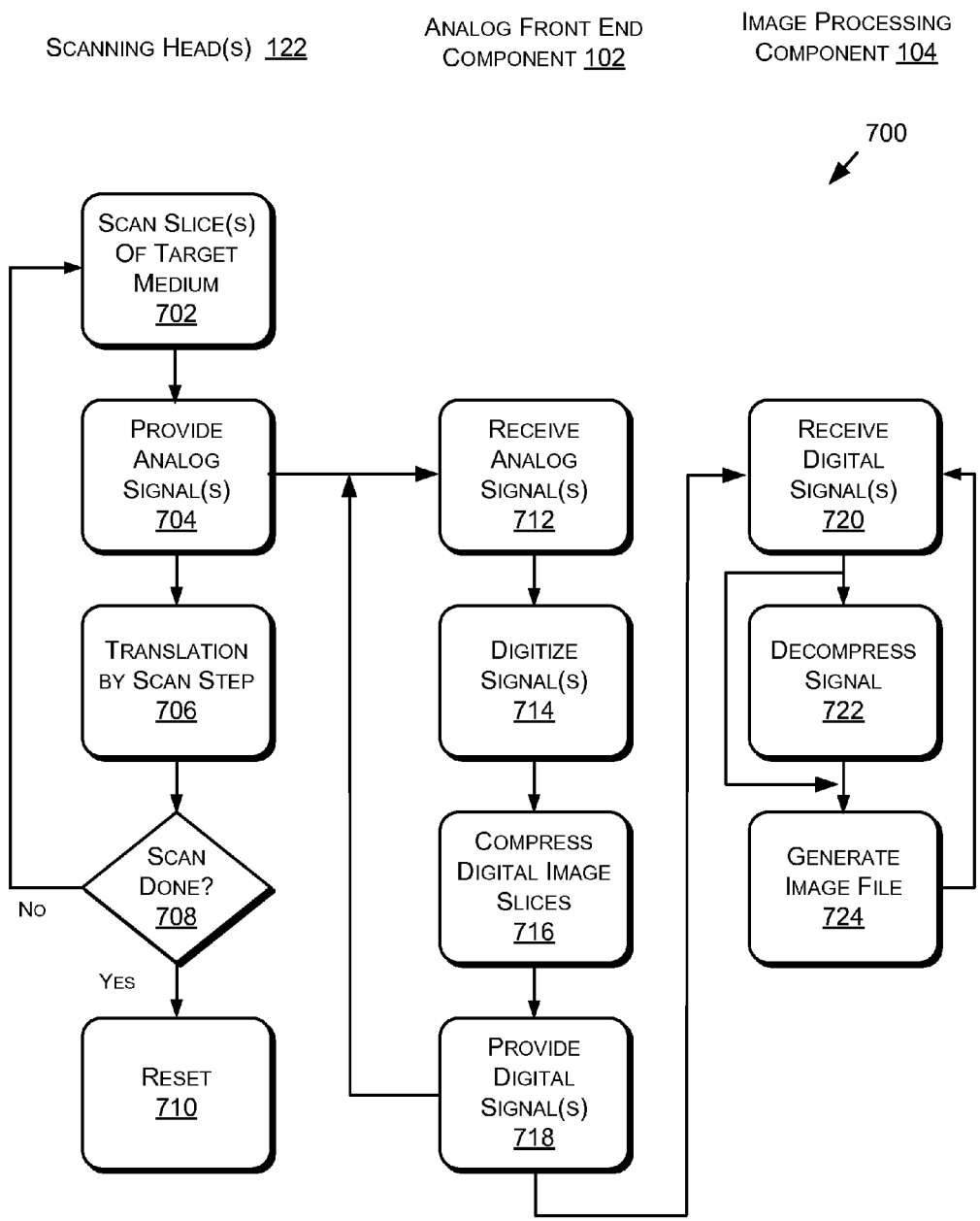
FIG. 7 is a flow diagram of a process for generating an image file.

FIG. 7 illustrates a process 700 of scanning the target medium 114. Various acts of the process 700 may occur at the analog front-end component 102, the image processing component 104, and the carriage 122. In various implementations, one or more of the acts of the process 700 may occur in parallel, in different order, and/or may be omitted.

At 702, a number of scan heads 122 scan a corresponding slice of the target medium 114. Each scan head 122 acquires a corresponding analog image slice of the target medium 114. In some embodiments, there may be one scan head 122. In other embodiments, the number of scan heads may be greater than one.

At 704, one or more analog signals corresponding to the acquired analog image slices of the target medium 114 are provided to the analog front-end component 102. In some embodiments, one or more of the analog image slices may be combined or interleaved into an analog signal that is provided to the analog front-end component 102. In some embodiments, analog signals, which correspond to image slices acquired by one or more scan heads 122, may be provided to the analog front-end component 102 in parallel.

At 706, a relative translation between the target medium 114 and the one or more scan heads 122 occurs. The size of the translation may be of scan step size. In some embodiments, the translation may occur by one or more steps of the target medium 114, one or more steps of the one or more scan heads 122, or by a combination of at least one step of the target medium 114 with at least one step of the one or more scan heads 122.

At 708, a determination of whether the scan of the target medium 114 is complete is made. In some embodiments, a counter may count the number of scan steps and a determination of whether the scan of the target medium 114 is complete may be based at least in part on the count of scan steps. In some embodiments, the determination of whether the scan is complete may be done by components of the carriage 120. In some embodiments, the image processing component 104 may make the determination of whether the scan is complete.

If the determination is negative, the process returns to 702. However, if the determination is affirmative, the process continues at 710, where the scan heads 122 are reset or returned to an initial scan position. Of course, in embodiments in which the scan heads 122 are stationary while the target document 114 is translated during a scan, act 710 may be omitted. Further, in some embodiments, the reset/return of the scan heads 122 occur at a beginning of a subsequent scan. Further, in some embodiments, the scanner device 100 is be configured to scan a first target medium in a first scan direction and to scan a second, next, target medium in a second scan direction, which is opposite of the first scan direction. In such embodiments, the reset/returning of scan heads 122 to an initial scan position may be omitted.

At 712, the analog front-end component 712 receives the one or more analog signals corresponding to the acquired analog image slices of the target medium 114 from the one or more scan heads 122. In some embodiments, the analog front-end component 102 receives multiple analog signals in parallel, where each of the analog signals may correspond to an analog image slice.

At 714, the analog front-end component 102 digitizes the analog signals to generate digitized image slices having digitized pixel values 144.

At 716, the analog front-end component 102 compresses the digitized image slices. In some implementations, the analog front-end component 102 compresses the digitized image slices with only the differentiator 138, with only the compression module 140, or with both the differentiator 138 and the compression module 140.

At 718, the analog front-end component 102 provides digital signals to the image processing component 104. In some implementations, the provided digital signals correspond to compressed digital image slices. However, in some implementations, acts 714 and 716 may be omitted. In such implementations, the provided digital signals correspond to digital image slices.

The analog front-end component 102 continues to receive analog signals from the scan heads 122 until the scan of the target document 114 is complete. In some embodiments, the analog front-end component 102 processes analog signals for different scan steps sequentially. However, in some embodiments, the analog front-end component 102 processes analog signals for different scan steps in parallel.

In some embodiments, the analog front-end component 102 receives analog signals for a scan step in parallel. The analog front-end component 102 may be configured to perform acts 712-718 for a single scan step in parallel. In some embodiments, the analog front-end component 102 receives first analog signals of an image slice acquired by scan head 122(a) and second analog signals of an image slice acquired by scan head 122(b). The analog front-end component 102 processes the first and second analog signals in parallel.

At 720, the image processing component 104 receives digital signals.

In implementations in which the received digital signals correspond to compressed digital image slices, the process continues at 722, and in implementations in which the received digital signals correspond to digital image slices, the process continues at 724.

At 722, the image processing component 104 decompresses the compressed digital image slices to yield digital image slices.

At 724, the image processing component 104 generates an image file from the digital image slices. The digital image slices are stored in the memory 154 to form the image file 400.

Figure 8:
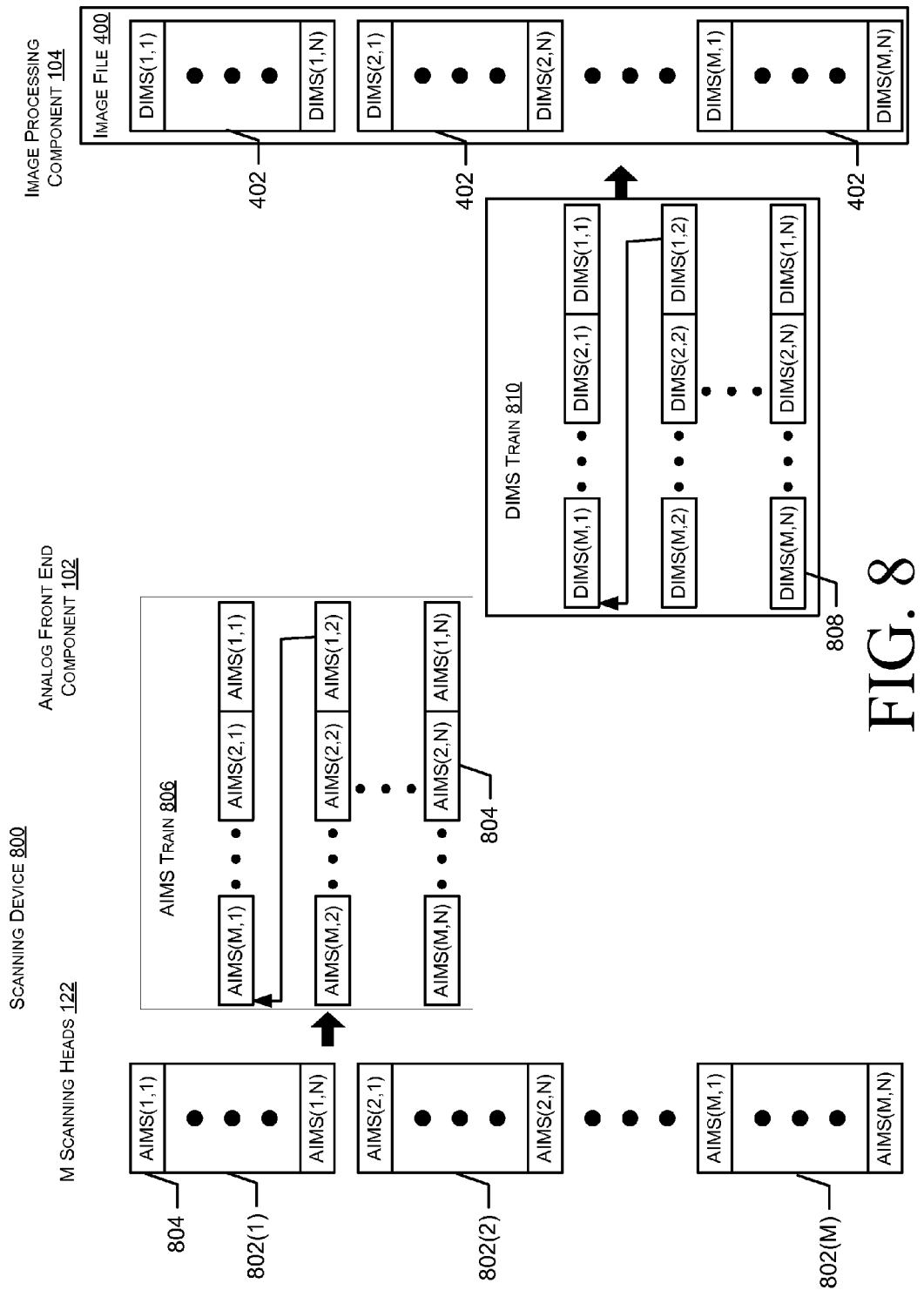
FIG. 8 schematically illustrates generating an image file with a scanner having an array of multiple scan heads.

FIG. 8 schematically illustrates generating the image file 400 with a scanner 800 having an array of M scan heads 122, where M is an integer greater than 2. In the example shown in FIG. 8, a sequence 802(J) of analog image slices (AIMS) 804 are acquired by a Jth scan head 122 of the scanner 800, where each analog image slice 804 is acquired at a scan step. Individual analog image slices 804 are referenced by a pair of indices (k,p), where k denotes the index of the scan head 122 that acquired the analog image slice and p denotes sequence position. Thus, the sequence 802(1) is comprised of AIMs(1, 1)-AIMs(1,N) and similarly for the remaining sequences 802(2)-802(M). Collectively the sequences 802(1)-802(M) constitute a complete scan of the target medium 114.

Over the course of the scan of the target medium 114, the analog front-end component 102 receives at least one train 806 of analog image slices 804. In some implementations, one or more of the sequences 802(1)-802(M) of analog image slices 804 are interleaved in the at least one train 806. In other implementations, the analog front-end component 102 receives at least one train 806 of analog image slices 804 that is comprised of only one sequence 802 of analog image slices 804. For example, the analog front-end component 102 receives a plurality of trains 806 (e.g., M trains), where each train 806 is comprised of a corresponding sequence 802 of analog image slices 804.

The analog front-end component 102 processes the analog image slices 804 into digital image slices (DIMS) 808. Individual digital image slices 810 are referenced by a pair of indices (k,p), where k and p of the digital image slices 810 and k and p of the analog image slice 804 are the same. In some implementations, the analog front-end component 102 compresses the digital image slices (DIMS) 808.

Over the course of the scan of the target medium 114, the image processing component 104 is provided with at least one train 810 of digital image slices 808, which are compressed in some implementations. In some implementations, the digital image slices 808 of the at least one train 810 correspond to the sequences 802 being interleaved. However, in other implementations, the at least one train 810 includes one train 810 that is comprised of digital image slices 808 corresponding to only one sequence 802 of analog image slices 804. For example, the analog front-end component 102 provide M trains 810, where each train 810 is comprised of a digital image slices 808 corresponding to a sequence 802 of analog image slices 804.

The image processing component 104 receives the at least one train 810 of digital image slices 808. In some implementations, the at least one train 810 of digital image slices 808 is compressed, and the image processing component 104 decompresses the digital image slices 808 of the at least one train 810. In other implementations, the at least one train 810 of digital image slices 808 is not compressed, and accordingly, the image processing component 104 does not attempt to decompresses the digital image slices 808 of the at least one train 810. The image processing component 104 generates partial image files 402 from the digital image slices 810 that correspond to a sequence 802 of analog image slices 804.

In some implementations, the image processing component 104 may deinterleave digital image slices 808 of the at least one train 810 to generate the partial image files 404.

However, in some implementations, the at least one train 810 may include one train 810 that is comprised of digital image slices 808 that correspond to only one sequence 802 of analog image slices 804. For example, the image processing component 104 may receive a plurality of trains 810 (e.g., M trains), each train 810 may be comprised of digital image slices 808 corresponding to a sequence 802 of analog image slices 804. In such implementations, the image processing component 104 may generate one or more corresponding partial images 404 without deinterleaving, or attempting to deinterleave, such trains 810.

The description may use perspective-based descriptions such as over/under. Such descriptions are merely used to facilitate the discussion and are not intended to restrict the application of embodiments described herein to any particular orientation.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A scanner device comprising:
   a plurality of image sensor arrays, wherein each image sensor array of the plurality of image sensor arrays is configured to acquire a corresponding sequence of analog image slices such that a plurality of corresponding sequences of analog image slices are acquired by the plurality of image sensor arrays, wherein
      (i) each one of the plurality of corresponding sequences of analog image slices is concurrently acquired, and
      (ii) each one of the plurality of corresponding sequences of analog image slices represents a contiguous partial scan of a target medium by a corresponding image sensor array of the plurality of image sensor arrays;
   an analog front end component configured to (i) receive the plurality of sequences of analog image slices and (ii) convert the plurality of sequences of analog images slices into a corresponding plurality of sequences of digital image slices; and
   an image processing component configured to generate an image file representing the target medium scanned by the plurality of image sensor arrays based at least in part on the plurality of corresponding sequences of digital image slices,
   wherein the analog front end component is configured to convert, in parallel, analog image slices from at least two of the plurality of sequences of analog image slices.

2. The scanner device of claim 1, further comprising:
   a media transport path configured to advance the target medium along the media transport path during a scan of the target medium.

3. The scanner device of claim 1, wherein the image processing component is configured to arrange, in the image file, the plurality of corresponding sequences of digital image slices in an order that corresponds to a contiguous scan of the target medium.

4. A scanner device comprising:
   a plurality of image sensor arrays, wherein each image sensor array of the plurality of image sensor arrays is configured to acquire a corresponding sequence of image slices such that a plurality of corresponding sequences of image slices is acquired by the plurality of image sensor arrays, wherein
      (i) each one of the plurality of corresponding sequences of image slices is concurrently acquired, and
      (ii) each one of the plurality of corresponding sequences of image slices represents a contiguous partial scan of a target medium by a corresponding image sensor array of the plurality of image sensor arrays;
   an image processing component configured to generate an image file representing the target medium scanned by the plurality of image sensor arrays based at least in part on the plurality of corresponding sequences of image slices, wherein the image processing component is configured to determine a separation distance between immediately adjacent image sensor arrays of the plurality of image sensors arrays; and
   at least one driver configured to drive at least one image sensor array of the plurality of image sensor arrays from a first location to a second location, wherein at the second location the at least one image sensor array of the plurality of image sensor array is separated from an immediate adjacent image sensor array of the plurality of image sensor arrays by the determined separation distance.

5. The scanner device of claim 4, further comprising:
   one or more input and output devices configured to provide a user interface to receive user input selecting at least one of (i) a scan orientation for the target medium and (ii) a size for the target medium, wherein the image processing component determines the separation distance based at least in part on the user input.

6. The scanner device of claim 4, further comprising:
   a carriage configured to carry the plurality of image sensors; and
   a carriage motor configured to translate the carriage, wherein the plurality of image sensors are translated as one with the carriage.

7. The scanner device of claim 6, wherein the at least one driver is carried by the carriage.

8. A scanner device comprising:
   a plurality of image sensor arrays, wherein each image sensor array of the plurality of image sensor arrays is configured to acquire a corresponding sequence of image slices such that a plurality of corresponding sequences of image slices is acquired by the plurality of image sensor arrays, wherein
      (i) each one of the plurality of corresponding sequences of image slices is concurrently acquired, and
      (ii) each one of the plurality of corresponding sequences of image slices represents a contiguous partial scan of a target medium by a corresponding image sensor array of the plurality of image sensor arrays;
   an image processing component configured to generate an image file representing the target medium scanned by the plurality of image sensor arrays based at least in part on the plurality of corresponding sequences of image slices,
      wherein a first sequence of image slices of the plurality of corresponding sequences of image slices includes at least one image slice that is an approximate or full duplicate of at least one image slice of a second sequence of image slices of the plurality of corresponding sequences of image slices, and wherein the image processing component is configured to omit the at least one image slice of the first sequence of image slices of the plurality of corresponding sequences of image slices.

9. A method of scanning a target medium, comprising:
concurrently acquiring a plurality of sequences of analog image slices with a corresponding plurality of image sensor arrays, wherein each sequence of analog image slices of the plurality of sequences of analog image slices represents a contiguous partial scan of the target medium by a corresponding image sensor array of the plurality of image sensor arrays;
converting the plurality of sequences of analog image slices into a plurality of sequences of digital image slices, wherein each analog image slice comprises a plurality of analog pixel values that are digitized to convert into a corresponding digital image slice;
based at least in part on the plurality of sequences of digital image slices, generating an image file representing the target medium scanned by the plurality of image sensor arrays,
wherein the converting the plurality of sequences of analog image slices into the plurality of sequences of digital image slices comprises
converting, in parallel, analog image slices from each of the plurality of sequences of analog image slices.

10. A method of scanning a target medium, comprising:
concurrently acquiring a plurality of sequences of image slices with a corresponding plurality of image sensor arrays, wherein each sequence of image slices of the plurality of image slices represents a contiguous partial scan of a target medium by a corresponding image sensor array of the plurality of image sensor arrays;
partitioning a contiguous scan zone into a plurality of contiguous partial scan zones;
aligning, one to one, a respective partial scan zone of the plurality of contiguous partial scan zones and a respective image sensor array of the plurality of image sensor arrays; and
generating an image file representing the target medium scanned by the plurality of image sensor arrays based at least in part on the plurality of sequences of image slices.

11. The method of claim 10, further comprising:
determining separation distances between immediately adjacent image sensor arrays of the plurality of image sensors arrays; and
driving at least one image sensor array of the plurality of image sensor arrays to at least a distance that is equal to the separation distance between the at least one image sensor array and immediate adjacent image sensor arrays.

12. The method of claim 11, wherein the determining separation distances between immediately adjacent image sensor arrays of the plurality of image sensors arrays includes:
obtaining a total scan length;
dividing the total scan length by an image sensor array number (N) to obtain a quotient, wherein the image sensor array number (N) is equal to a total number of image sensors arrays that make up the plurality of image sensor arrays, and wherein the separation distances are approximately equal to the quotient.

13. The method of claim 12, wherein the obtaining a total scan length is based at least one of a scan orientation for the target medium and a size for the target medium.

14. The method of claim 10, wherein the concurrently acquiring a plurality of sequences of image slices with a corresponding plurality of image sensor arrays includes:
concurrently scanning each partial scan zone with the respective image sensor array aligned therewith.

15. The method of claim 10, wherein the concurrently acquiring a plurality of sequences of image slices with a corresponding plurality of image sensor arrays includes iteratively:
(i) capturing, during a scan interval of time, an image slice with each of image sensor array of the plurality of image sensor arrays;
(ii) causing, after the scan interval of time, a relative translation between the target medium and the plurality of image sensor arrays; and
(iii) including each captured image slice in a corresponding sequence of image slices of the plurality of sequences of image slices.

16. The method of claim 10, wherein the concurrently acquiring a plurality of sequences of image slices with a corresponding plurality of image sensor arrays includes:
causing a relative translation between the target medium and each image sensor array of the plurality of image sensor arrays, wherein the relative translation between the target medium and each image sensor array of the plurality of image sensor arrays is caused by one of
(i) only moving the plurality of image sensor arrays,
(ii) only moving the target medium, and
(iii) a combination of moving both the target medium and the plurality of image sensor arrays.

17. A scanner device comprising:
a carriage carrying a plurality of image sensor arrays, each image sensor array configured to acquire a corresponding sequence of analog image slices, wherein each sequence of analog image slices are concurrently acquired and each sequence of analog image slices represents a contiguous partial scan of a target medium by a corresponding image sensor array of the plurality of image sensor arrays;
a carriage motor configured to translate the carriage during a scan of the target medium;
an analog front end component configured to receive the plurality of sequences of analog image slices and convert the plurality of sequences of analog images slices into a corresponding plurality of sequences of digital image slices;
an image processing component configured to generate an image file representing the target medium scanned by the plurality of image sensor arrays based at least in part on the plurality of sequences of digital image slices; and
at least one driver configured to drive at least one image sensor array of the plurality of image sensor arrays from a first location to a second location, wherein at the second location each image sensor array of the plurality of image sensor array is separated from immediate adjacent image sensor arrays by a specified separation distance,
wherein the image processing component is configured to determine the specified separation distance between immediately adjacent image sensor arrays of the plurality of image sensors arrays based at least in part on a scan length and an image sensor array number (N), wherein the image sensor array number (N) is equal to a total number of image sensors arrays that make up the plurality of image sensor arrays.

* * * * *